Sept. 9, 1930. A. F. MASURY ET AL Re. 17,795
SECTIONAL RUBBER PAVEMENT
Original Filed July 17, 1924 2 Sheets-Sheet 1
Fig. 1.
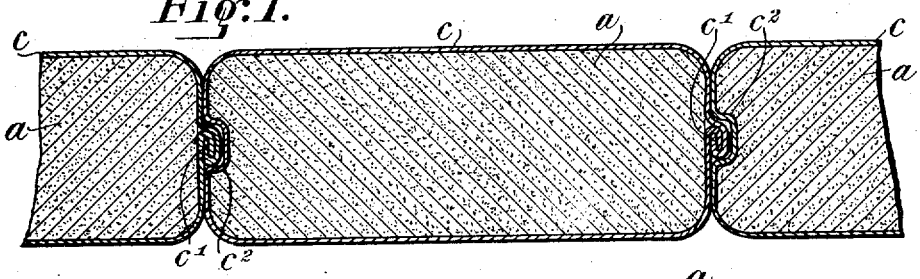
Fig. 2.
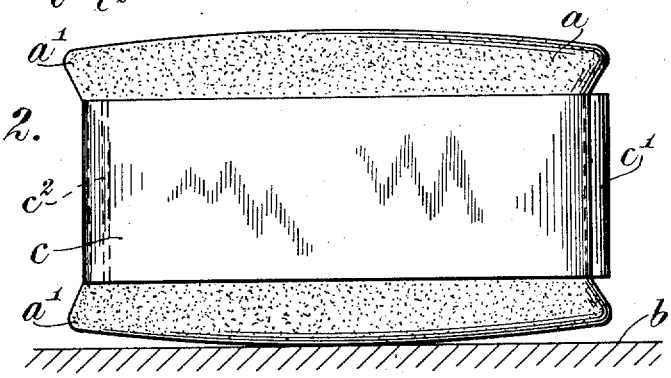
Fig. 3.
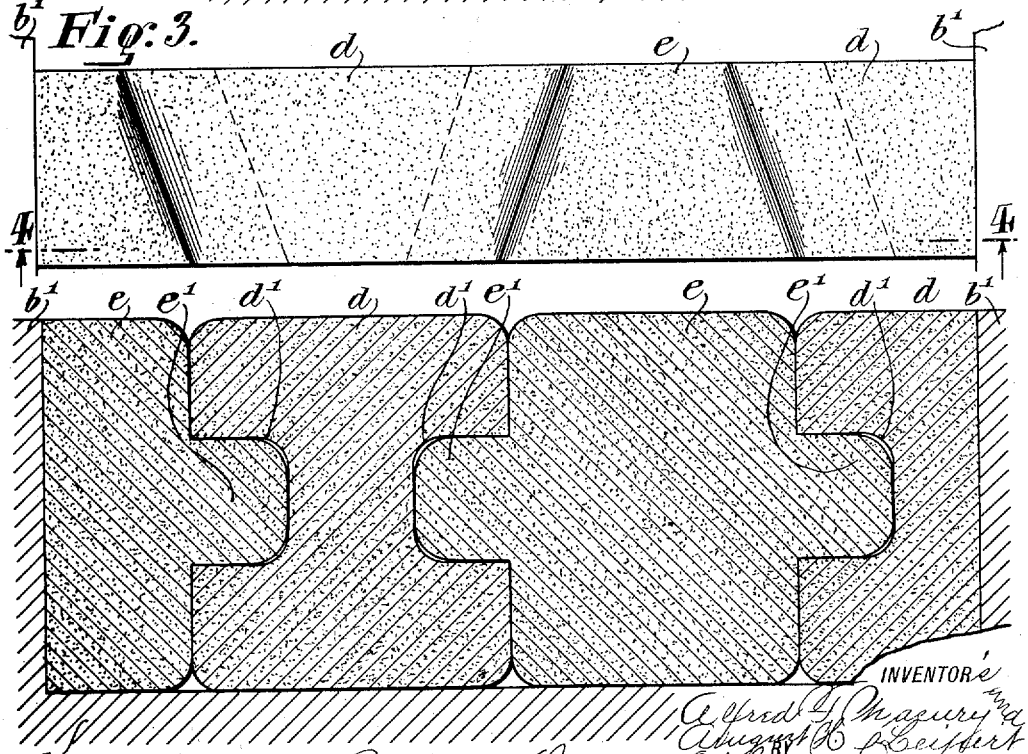
Fig. 4.
INVENTORS
Alfred F. Masury
August C. Seifert
BY
Redding Greeley O'Shea & Ampthill.
ATTORNEYS Sept. 9, 1930. A. F. MASURY ET AL Re. 17,795

SECTIONAL RUBBER PAVEMENT

Original Filed July 17, 1924 2 Sheets-Sheet 2

INVENTORS
Alfred F. Masury and
August Leppert
BY
Redding Greeley O'Shea & Campbell
ATTORNEYS Reissued Sept. 9, 1930 Re. 17,795

UNITED STATES PATENT OFFICE

ALFRED F. MASURY AND AUGUST H. LEIPERT, OF NEW YORK, N. Y., ASSIGNORS, BY MESNE ASSIGNMENTS, TO THE RUBBER SHOCK INSULATOR CORPORATION, OF WILMINGTON, DELAWARE, A CORPORATION OF DELAWARE

SECTIONAL RUBBER PAVEMENT

Original No. 1,643,024, dated September 20, 1927, Serial No. 726,441, filed July 17, 1924. Application for reissue filed August 7, 1929. Serial No. 384,054.

This invention relates to roadways and methods of making the same and more particularly to paving blocks and methods of manufacturing such paving blocks. The invention has for its particular object to provide a pavement which shall be yielding to a degree to minimize the shocks impressed upon pedestrians, animals and vehicles traveling thereover and the noise resulting from such travel. Such a paving is broadly illustrated in the copending application of August H. Leipert, Serial No. 722, 648, filed June 27, 1924. The present invention has to do primarily with various practical applications of the broad principle described in the application. In order that the invention may be clearly understood and readily carried into effect the same will now be described more fully with reference to the accompanying drawings illustrating preferred embodiments thereof and in which:

Figure 1 is a sectional view showing one form of paving block and the means for maintaining it under internal static pressure which also serves as interlocking means with adjacent blocks.

Fig. 2 is a view in side elevation showing the paving block according to Figure 1.

Fig. 3 is a plan view showing another modification of the paving block and the means for maintaining it under compression.

Figure 4 is a vertical sectional view taken in the plane indicated by the line 4—4 in Figure 3 and looking in the direction of the arrows.

It is proposed, according to the present invention, that the paving block shall consist of a mass of yielding material, such as live rubber, suitably associated with means which may vary in particular instances to retain the block under internal static pressure. By so retaining the block the resiliency, strength and wearing qualities of the yielding mass are materially improved. In Figures 1 and 2 of the drawings there is illustrated a block comprising a solid mass of yielding material *a* adapted to rest, when assembled with similar blocks, upon a solid base *b* to form a pavement and encircled throughout the major portion of its height by a band *c* of metallic material drawn tightly about the block whereby the resilient material therewithin may be maintained under compression. The two free ends of the band are preferably interlocked as at *c'* to form not only a permanent joint but also a projection or tongue on that end face of the band to interlock with a co-operating groove $c^2$ in the respective diametrically disposed face of an adjacent block. It will thus be seen that a paving block has been provided which is substantially rectangular in horizontal cross section and which is formed in one of its shorter end faces with a vertically disposed groove and in the other of its shorter end faces with a vertically disposed tongue. When laying the pavement, the blocks are laid between the curbs so that the proximate end faces are juxtaposed which will serve to compress somewhat the uncompressed edges *a'* to form a solid yielding pavement without cracks or open joints between the respective blocks.

In Figures 3 and 4 there is disclosed a plurality of paving blocks in which the shape of the respective blocks is relied upon to maintain the same under the desired internal static pressure. The blocks are formed generally wedge-shape in horizontal cross section so that in laying the same between the curbs *b'* an individual block may be forced in a horizontal direction between adjacent blocks. One of the blocks *d* is shown as formed in opposed vertical faces with horizontally extending grooves $d'$ adapted to co-operate with the horizontally extending tongues $e'$ of the adjacent blocks $e$. The longer sides of blocks $d$ and $e$ are respectively parallel whereby rows of such blocks may be conveniently laid according to accepted practice.

Figure 5:
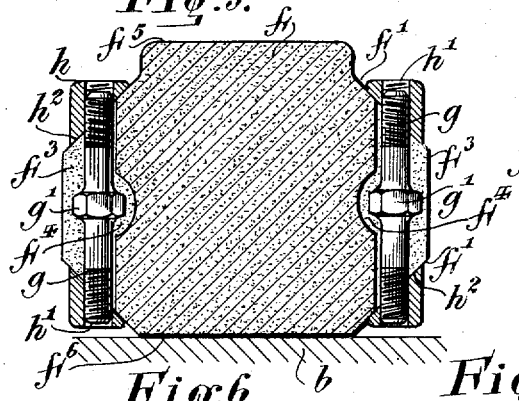
Figure 5 is a view partly in section of another modification of the invention showing the means for adjusting the compression on an individual paving block.

The paving block illustrated in Figure 5 is formed as a mass of yielding material $f$ having beveled edges $f'$. Centrally disposed between the ends thereof, the longer faces $f^2$ are formed respectively with vertical grooves $f^3$ for the passage of bolts $g$ threaded with right and left hand threads respectively into threaded recesses $h'$ in rectangular retaining elements $h$ whereof a respective face $h^2$ is beveled to co-operate with the beveled faces $f'$ of the block. Midway between the ends of the grooves $f^3$ the block is further hollowed out slightly as at $f^4$ to receive the wrench engaging portion $g'$ of the lag screw. It will thus be seen that upon assembly of the lag screws $g$ and rectangular retaining elements $h'$ the block may be placed under compression by taking up on the lag screws in usual manner. As a pavement, the blocks are laid upon a solid base $b$ in close proximity, the top and bottom faces of the block $f^5$, $f^6$, respectively, taking the wear and spacing the metallic portions from the contacting elements whereby shocks and stresses are relieved.

Figure 7:
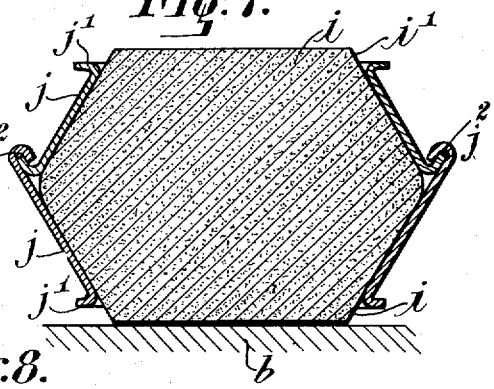
Figure 7 is a vertical sectional view showing another form of paving block and the mechanical means for retaining it under compression.
Figure 6:
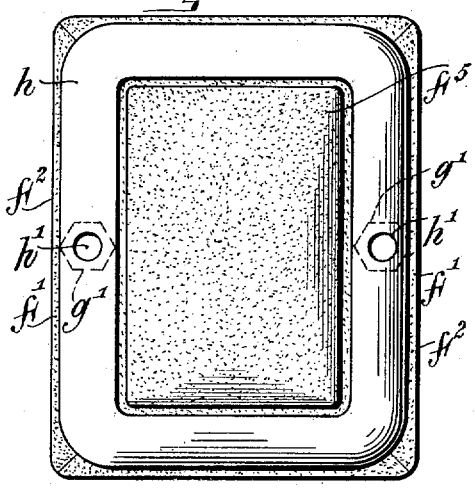
Figure 6 is a view showing the paving block illustrated in Figure 5 and looking from above.
Figure 8:
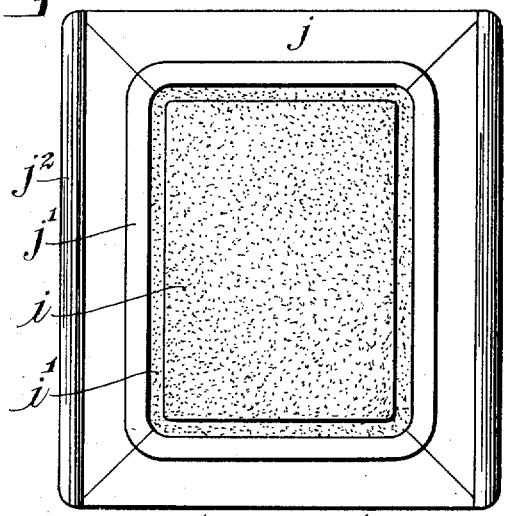
Figure 8 is a view showing the paving block disclosed in Figure 7 and looking from above.

In Figures 7 and 8, means are disclosed for obtaining substantially the same results. In this instance, substantially rectangular blocks $i$ having beveled edges $i'$ are retained under compression by rectangular metallic frames $j$ whereof the extremities $j'$ are turned away from the resilient material to avoid a sharp edge which would wear the material, while the proximate edges of the plates $j$ are interlocked as at $j^2$. It will be apparent that, upon assembling the block $i$ with a pair of frame members $j$, the block can be placed under the desired internal compression by suitably bending over and interlocking the proximate edges at $j^2$. Here again the surface of the block resting upon the base $b$ is of yielding character as well as the top surface subject to wear, the turned over edges $j'$ being sufficiently spaced from the wearing surfaces to avoid all metal contact with either the base or traffic passing thereover.

Figure 9:
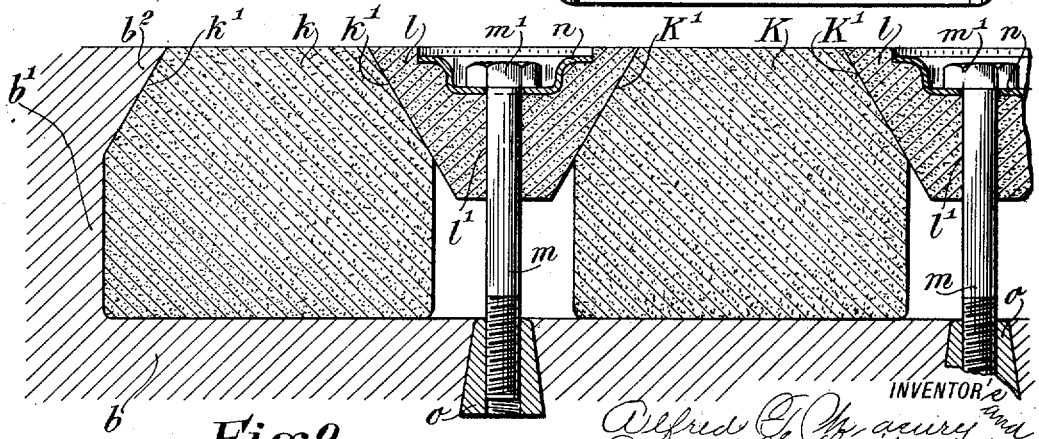
Figure 9 is a view showing another modification of the pavement according to the present invention and means for placing the individual blocks under compression.

Referring now to Figure 9, the blocks $k$ may be either square or oblong in horizontal cross section. In this instance only the upper edge is beveled as at $k'$. The curb may have an overlying portion $b^2$ with which the bevel $k'$ engages while the proximate block K may be spaced from block $k$ to receive an inverted frusto-pyramidal yielding member $l$ bored centrally as at $l'$ to receive bolt $m$. If desired the head $m'$ of bolt $m$ may bear upon a metallic seat member $n$ to minimize wear on the yielding material. Bolt $m$ may be either an expansion bolt or a bolt of the usual kind in which event the threaded end may engage the threaded hole of a metallic nut $o$ cast in the concrete base $b$. Upon assembly, by screwing the bolt into the nut $o$, the seat member $n$ is caused to compress the beveled resilient retaining member $l$ which in turn engages the beveled edges $k'$, $k'$, of adjacent blocks to cause all of the resilient blocks to be retained under internal static pressure in a manner which will be readily understood upon inspection of Figure 9.

Various resilient blocks and means for retaining them under compression and the manner of assembling them into a complete pavement have been disclosed. It will be understood that the invention is not to be limited to the precise relation of elements illustrated in the drawings but various combinations thereof will occur to those skilled in the art and are to be deemed within the scope of the present invention.

What we claim is:—

1. A roadway comprising a rigid, solid base, contiguous blocks of rubber supported on said base, interlocking means, and a plurality of means to maintain said blocks under compression.

2. A paving block comprising a block of rubber and retaining means encircling said block, said means comprising a strip of metal of such width as to confine the greater part of the block against lateral distortion when subjected to service loads in a pavement.

3. A pavement comprising a plurality of rubber blocks, and a retaining band about each block, the retaining band of each block contacting with the band of an adjacent block.

4. A pavement comprising a plurality of contiguous rubber blocks, and a plurality of contiguous retaining bands, said bands encircling said blocks respectively.

5. A pavement comprising a plurality of contiguous pavement blocks, each comprising a block of rubber and a confining band encircling the same, said band being of sufficient width substantially to prevent lateral stresses in each block from being communicated to adjoining blocks.

6. A pavement comprising a plurality of contiguous pavement blocks, each comprising a block of rubber, bands confining individual blocks leaving the upper margins thereof unconfined, whereby the sum of all the upper surfaces of the blocks forms the complete surface of the area of pavement thus composed.

In testimony whereof, we have signed this specification.

ALFRED F. MASURY.
AUGUST H. LEIPERT.